Patented Oct. 27, 1925.

1,559,156

UNITED STATES PATENT OFFICE.

CHARLES F. BULLOCK, OF SCHENECTADY, NEW YORK, ASSIGNOR TO GENERAL ELECTRIC COMPANY, A CORPORATION OF NEW YORK.

ORIFICE-TYPE PRESSURE-DIFFERENCE-CREATING DEVICE FOR FLOW METERS.

Application filed November 8, 1924. Serial No. 748,780.

*To all whom it may concern:*

Be it known that I, CHARLES F. BULLOCK, a citizen of the United States, residing at Schenectady, in the county of Schenectady, State of New York, have invented certain new and useful Improvements in Orifice-Type Pressure-Difference-Creating Devices for Flow Meters, of which the following is a specification.

The present invention relates to flow meters for measuring the flow of fluids through conduits and especially to orifice type pressure difference creating devices which, as is well known, are used in connection with flow meters to create a pressure difference which bears a definite relation to the rate of flow. By an orifice type pressure difference creating device I mean a pressure difference creating device of the type comprising a member which is inserted in the conduit through which the fluid flows and provides an orifice or opening of less area than the area of the conduit whereby there is a drop in pressure across it.

In many cases where the rate of flow is low in a small pipe, the orifice or opening in the pressure difference creating device becomes so small in order to produce sufficient drop in pressure through it, i. e., sufficient pressure difference for measuring the flow, that it is not practical to manufacture because of the great accuracy required in such a case. Furthermore, even if it could be manufactured with sufficient accuracy, the least scale or corrosion would affect the orifice diameter to such an extent that the meter would be appreciably in error. With small diameter orifices there is also danger of stoppage due to scale or other matter becoming lodged in the throat.

The object of my invention is to provide an improved construction and arrangement whereby I am enabled to obtain in a practical manner the desired drop in pressure under the conditions above referred to, by the use of two or more orifices of larger size arranged in series, and for a consideration of what I believe to be novel and my invention, attention is directed to the accompanying description and the claims appended thereto.

Figure 1:
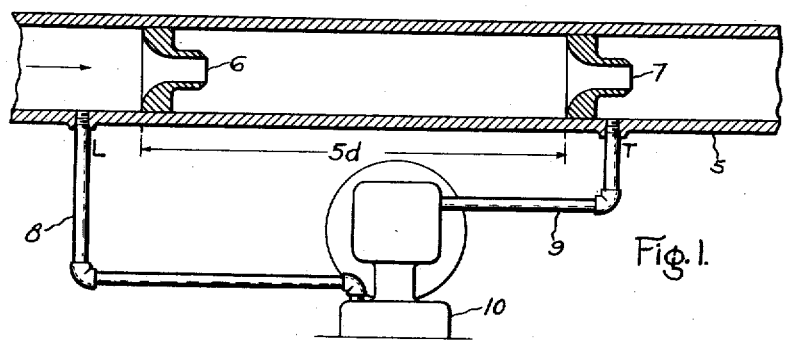
Figure 2:
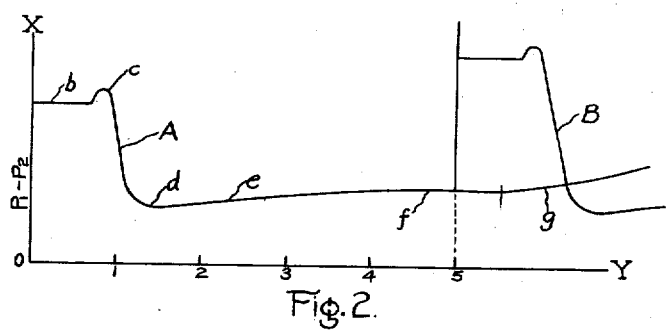
Figure 3:
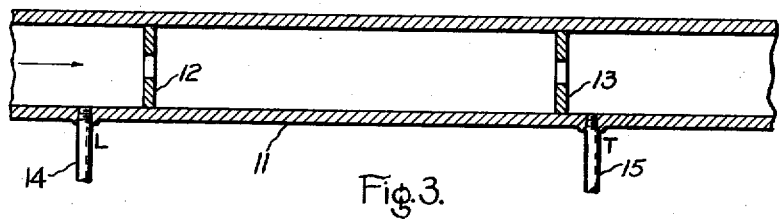
Figure 4:
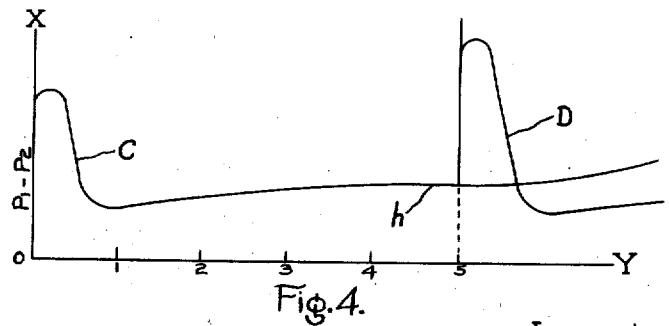

In the drawing, Fig. 1 is a sectional view of a pressure difference creating device embodying my invention; Fig. 2 is a diagram illustrating the pressure drop through the device shown in Fig. 1, and Figs. 3 and 4 are views similar to Figs. 1 and 2 illustrating another construction and arrangement embodying my invention.

Referring to Fig. 1 of the drawing, 5 indicates a conduit through which a fluid to be metered flows and 6 and 7 indicate pressure difference creating devices of the orifice type located therein. The devices illustrated are of a known type usually termed a flow nozzle, such flow nozzles being particularly disclosed in the patent to Dodge, 1,298,471, dated March 25, 1919.

Referring to Fig. 2 of the drawing, the distance along the vertical line O—X represents pressure drop across an orifice measured, for example, in inches of mercury deflection. In other words, it represents $P_1-P_2$ where $P_1$ is the pressure in advance of the orifice as regards the direction of flow and $P_2$ is the pressure at any point beyond the orifice. Distances along the horizontal line O—Y represent distances along conduit 5, the scale being laid off in pipe diameters, that is, in diameters of the inside of conduit 5. The line A indicates the value of $P_1-P_2$ at points along conduit 5, just beyond flow nozzle 6. Considering this line it will be seen that the value $P_1-P_2$ is first constant for a short distance as indicated at *b*. Just at the end of the flow nozzle the value increases as is indicated at *c* after which it falls off rapidly to a point *d*. The value then increases slowly as indicated at *e* to a point in the neighborhood of five pipe diameters down stream when it again becomes straight for a short distance as is indicated at *f*. The straight portion *f* begins at about four and one half pipe diameters and terminates at about five and one half pipe diameters down stream from the flow nozzle. Following this, it then gradually increases again as is indicated at *g*.

The distance indicated at *f* provides a region of some length where the pressure difference is substantially constant and in carrying out my invention I take advantage of this and locate my second flow nozzle in this region. With the second flow nozzle I then obtain a pressure difference line as is indicated at B, which corresponds in shape to line A, differing from it only in the value of $P_1-P_2$, which is greater. I then connect the leading pressure pipe in advance of flow nozzle 6 as is indicated at 8 and the trailing pressure pipe beyond flow nozzle 7 as is indicated at 9. As is well understood, the two pipes 8 and 9 lead to the indicating instrument of the flow meter, which instrument is shown diagrammatically at 10. It may be of any suitable structure. I may, of course, use more than two flow nozzles in series if found desirable, as is obvious.

By locating the second flow nozzle in the region of the straight portion $f$ of line A, that is, in the neighborhood of five pipe diameters down stream from the first flow nozzle, I obtain an important advantage from a practical standpoint in that I have a region of constant pressure the location of which can be readily found and which is of a length sufficient to enable the flow nozzle to be readily located. As a result, the structure having been initially calibrated and its constant determined, can be installed and operated without special calibration. This, of course, is very important from a practical standpoint, for otherwise it would be necessary to calibrate each flow meter after installation.

In Figs. 3 and 4 I have shown my invention in connection with an orifice of the plain disk type, 11 being the conduit through which the fluid to be metered flows, 12 and 13 being the two orifices corresponding to orifices 6 and 7 of Fig. 1, and 14 and 15 being the leading and trailing pipe connections.

In Figs. 4, lines C and D are lines corresponding to the lines A and B in Fig. 2 and, as will be seen from an inspection of the drawing, line C has a straight portion $h$ corresponding to the straight portion $f$ in Fig. 2 at which the orifice 12 is located.

In accordance with the provisions of the patent statutes, I have described the principle of operation of my invention, together with apparatus which I now consider to represent the best embodiment thereof, but I desire to have it understood that the apparatus shown is only illustrative and that the invention may be carried out by other means.

What I claim as new and desire to secure by Letters Patent in the United States is:—

1. The combination with a pipe of a pressure difference creating device therein comprising a plurality of individual pressure difference creating devices of the orifice type spaced approximately five pipe diameters apart.

2. The combination with a pipe through which a fluid to be metered flows, of a plurality of pressure difference creating devices of the orifice type in the conduit, said devices being spaced in the neighborhood of five pipe diameters apart, and leading and trailing pressure pipes connected to the first named pipe in advance of the first pressure difference creating device and beyond the last pressure difference creating device.

3. The combination with a pipe through which a fluid to be metered flows, of two flow nozzles in the pipe arranged in series, the second flow nozzle being located in the neighborhood of five diameters from the first flow nozzle.

In witness whereof, I have hereunto set my hand this 7th day of November, 1924.

CHARLES F. BULLOCK.

nozzle 6 as is indicated at 8 and the trailing pressure pipe beyond flow nozzle 7 as is indicated at 9. As is well understood, the two pipes 8 and 9 lead to the indicating instrument of the flow meter, which instrument is shown diagrammatically at 10. It may be of any suitable structure. I may, of course, use more than two flow nozzles in series if found desirable, as is obvious.

By locating the second flow nozzle in the region of the straight portion $f$ of line A, that is, in the neighborhood of five pipe diameters down stream from the first flow nozzle, I obtain an important advantage from a practical standpoint in that I have a region of constant pressure the location of which can be readily found and which is of a length sufficient to enable the flow nozzle to be readily located. As a result, the structure having been initially calibrated and its constant determined, can be installed and operated without special calibration. This, of course, is very important from a practical standpoint, for otherwise it would be necessary to calibrate each flow meter after installation.

In Figs. 3 and 4 I have shown my invention in connection with an orifice of the plain disk type, 11 being the conduit through which the fluid to be metered flows, 12 and 13 being the two orifices corresponding to orifices 6 and 7 of Fig. 1, and 14 and 15 being the leading and trailing pipe connections.

In Figs. 4, lines C and D are lines corresponding to the lines A and B in Fig. 2 and, as will be seen from an inspection of the drawing, line C has a straight portion $h$ corresponding to the straight portion $f$ in Fig. 2 at which the orifice 12 is located.

In accordance with the provisions of the patent statutes, I have described the principle of operation of my invention, together with apparatus which I now consider to represent the best embodiment thereof, but I desire to have it understood that the apparatus shown is only illustrative and that the invention may be carried out by other means.

What I claim as new and desire to secure by Letters Patent in the United States is:—

1. The combination with a pipe of a pressure difference creating device therein comprising a plurality of individual pressure difference creating devices of the orifice type spaced approximately five pipe diameters apart.

2. The combination with a pipe through which a fluid to be metered flows, of a plurality of pressure difference creating devices of the orifice type in the conduit, said devices being spaced in the neighborhood of five pipe diameters apart, and leading and trailing pressure pipes connected to the first named pipe in advance of the first pressure difference creating device and beyond the last pressure difference creating device.

3. The combination with a pipe through which a fluid to be metered flows, of two flow nozzles in the pipe arranged in series, the second flow nozzle being located in the neighborhood of five diameters from the first flow nozzle.

In witness whereof, I have hereunto set my hand this 7th day of November, 1924.

CHARLES F. BULLOCK.

Certificate of Correction.

It is hereby certified that in Letters Patent No. 1,559,156, granted October 27, 1925, upon the application of Charles F. Bullock, of Schenectady, New York, for an improvement in "Orifice-Type Pressure-Difference-Creating Devices for Flow Meters," errors appear in the printed specification requiring correction as follows: Page 2, line 35, for " Figs." read *Fig.;* same page, line 72, claim 3, after the word " five " insert the word *pipe;* and that the said Letters Patent should be read with these corrections therein that the same may conform to the record of the case in the Patent Office.

Signed and sealed this 8th day of December, A. D. 1925.

[SEAL.]
WM. A. KINNAN,
*Acting Commissioner of Patents.*

Certificate of Correction.

It is hereby certified that in Letters Patent No. 1,559,156, granted October 27, 1925, upon the application of Charles F. Bullock, of Schenectady, New York, for an improvement in "Orifice-Type Pressure-Difference-Creating Devices for Flow Meters," errors appear in the printed specification requiring correction as follows: Page 2, line 35, for "Figs." read *Fig.*; same page, line 72, claim 3, after the word "five" insert the word *pipe*; and that the said Letters Patent should be read with these corrections therein that the same may conform to the record of the case in the Patent Office.

Signed and sealed this 8th day of December, A. D. 1925.

[SEAL.]
WM. A. KINNAN,
*Acting Commissioner of Patents.*